United States Patent [19]

Premerlani

[11] 4,432,031

[45] Feb. 14, 1984

[54] METHOD FOR OVERCURRENT PROTECTION

[75] Inventor: William J. Premerlani, Scotia, N.Y.

[73] Assignee: General Electric Company, Schenectady, N.Y.

[21] Appl. No.: 373,933

[22] Filed: May 3, 1982

[51] Int. Cl.³ .......................................... H02H 3/093
[52] U.S. Cl. ..................................... 361/97; 361/94; 361/63; 364/492; 364/483
[58] Field of Search .................... 361/96, 97, 95, 94, 361/93, 62, 63, 67, 68; 364/492, 481, 483

[56] References Cited

PUBLICATIONS

European Patent Application No. 5324, published 11/1979; by Di Pietro et al., "A New Delayed Action Electrical Protection Device, Depending on an Adjusted Magnitude".
UK Patent Application No. 2,020,124, published 11/1979; by Matsumoto, "Overcurrent Protection".
UK Patent Application, No. 2,047,995, published 12/1980; by-Fujisawa "Protective Relay system".
Benmouyal, Gabriel, "A Log-Table Based Algorithm for Implementing Microprocessor Time–Overcurrent Relays", 1982 IEEE, pp. 1-5.

*Primary Examiner*—Patrick R. Salce
*Attorney, Agent, or Firm*—Paul J. Checkovich; James C. Davis, Jr.; Marvin Snyder

[57] ABSTRACT

A method for detecting excessive current in a system and interrupting the delivery of further current thereto comprises determining actual system current, obtaining a value of a predetermined system parameter indicative of the time the actual system current can safely exist in the system, creating a dynamic history of the predetermined system parameter by repetitively modifying the predetermined system parameter in accordance with actual system current, and interrupting power to the system if the dynamic history of the predetermined system parameter exceeds a predetermined threshold. The predetermined system parameter may be quadratically extended into an undefined region in order to decrease the response time to an overload or fault condition.

8 Claims, 13 Drawing Figures

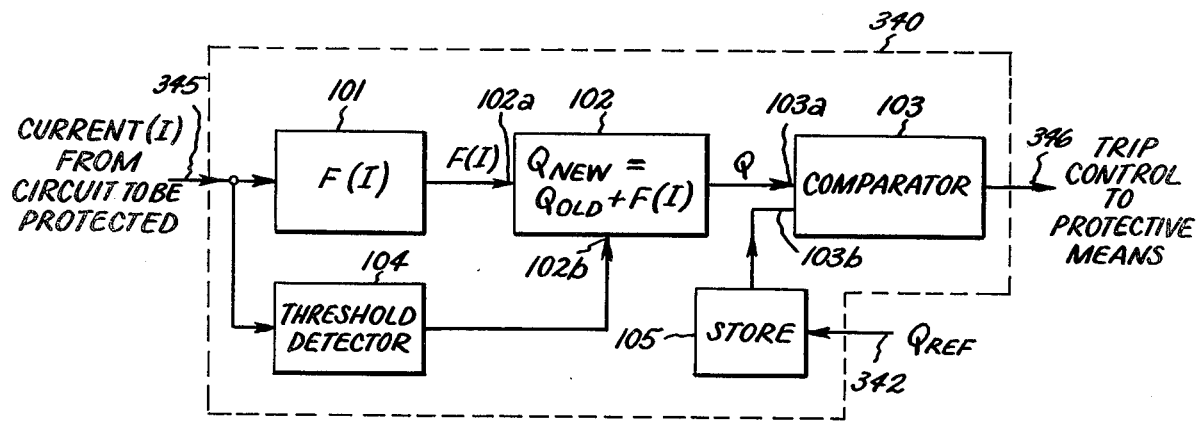
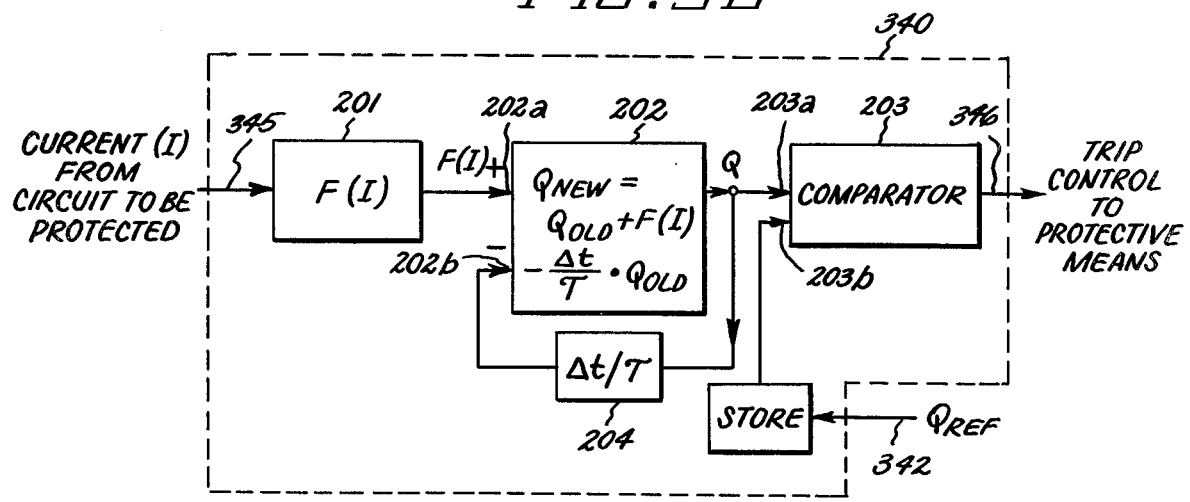

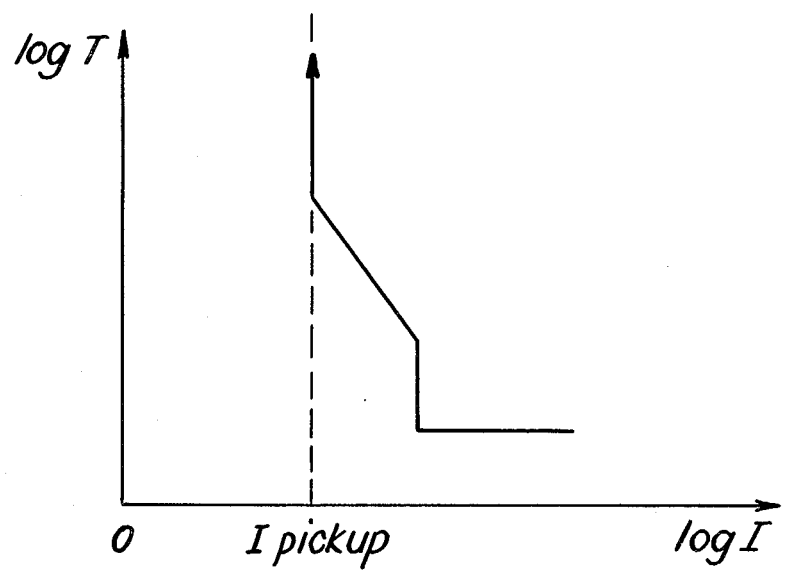
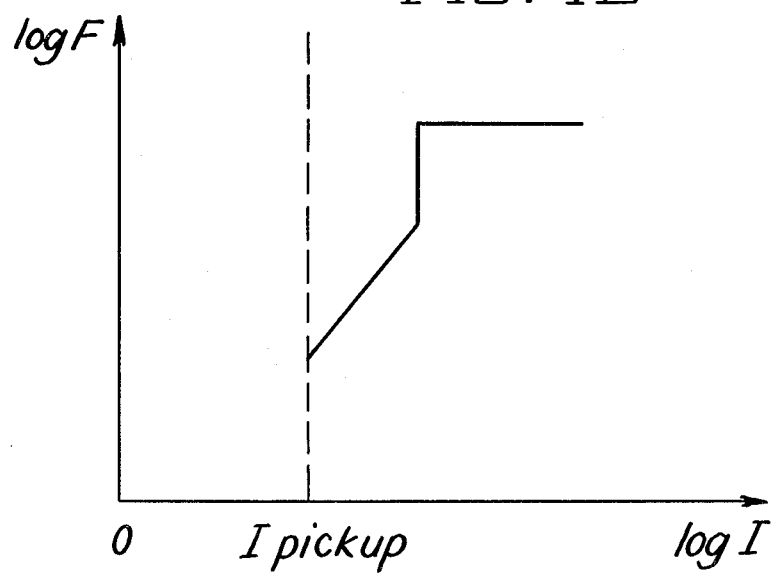

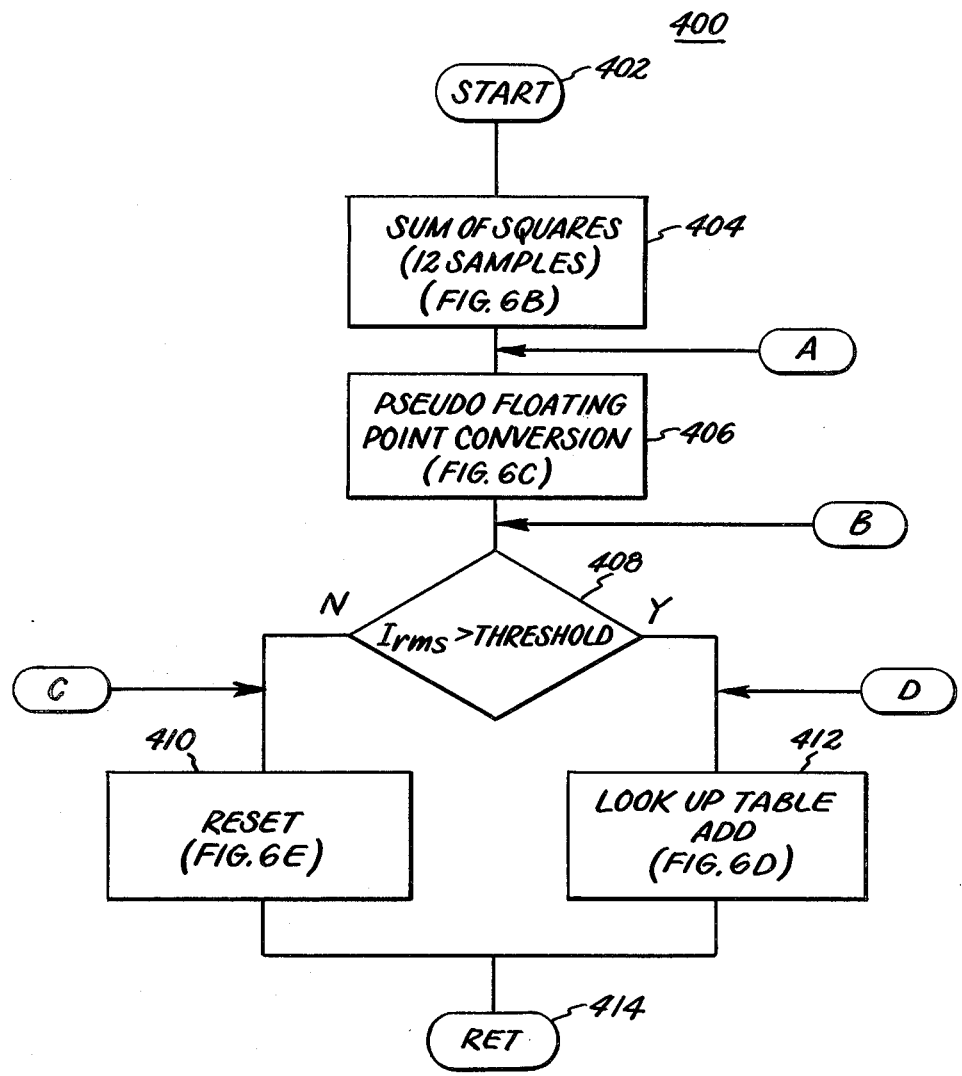

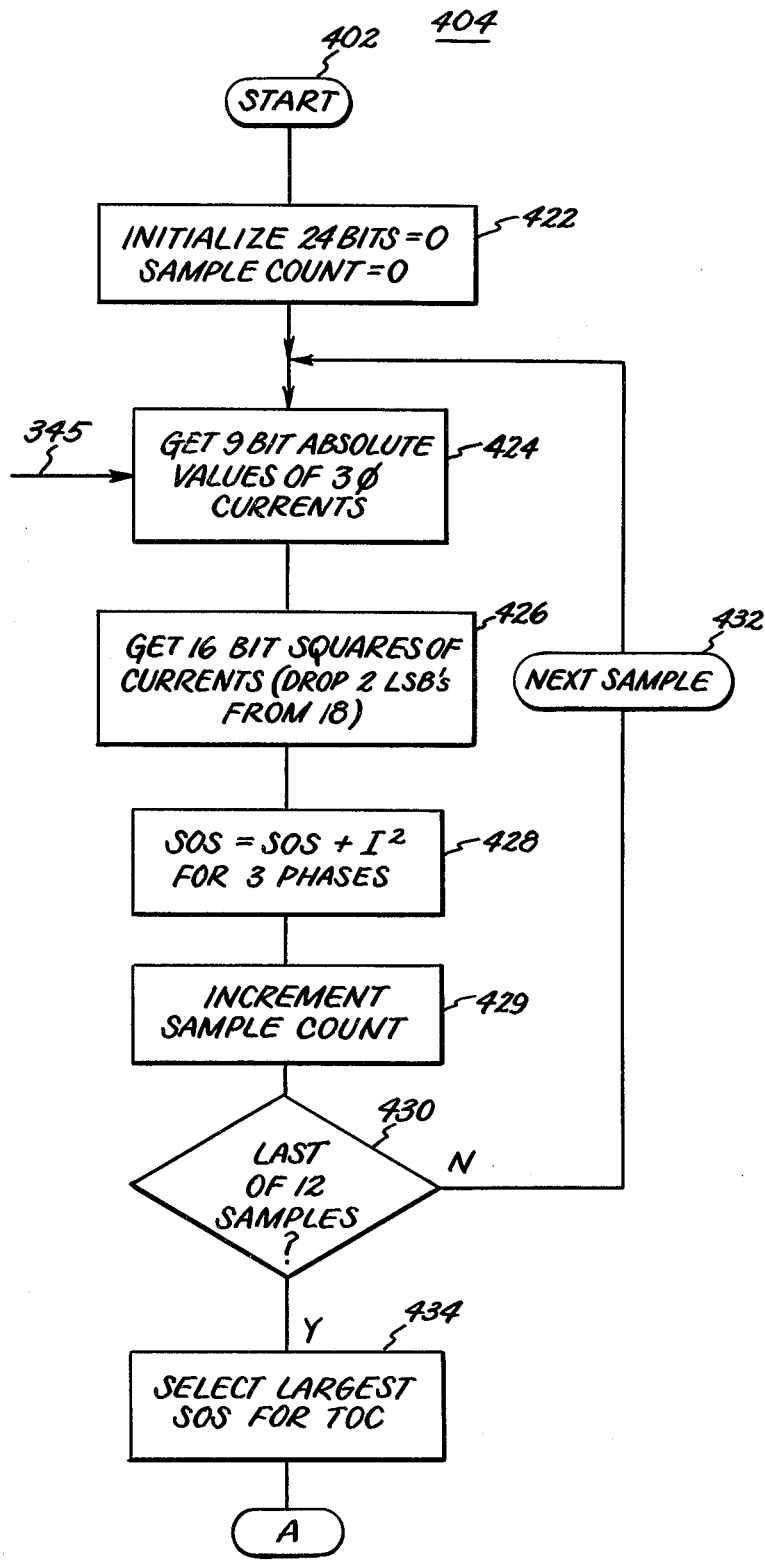

CONVERSION OF SOS TO TOC LOOK UP ADDRESS

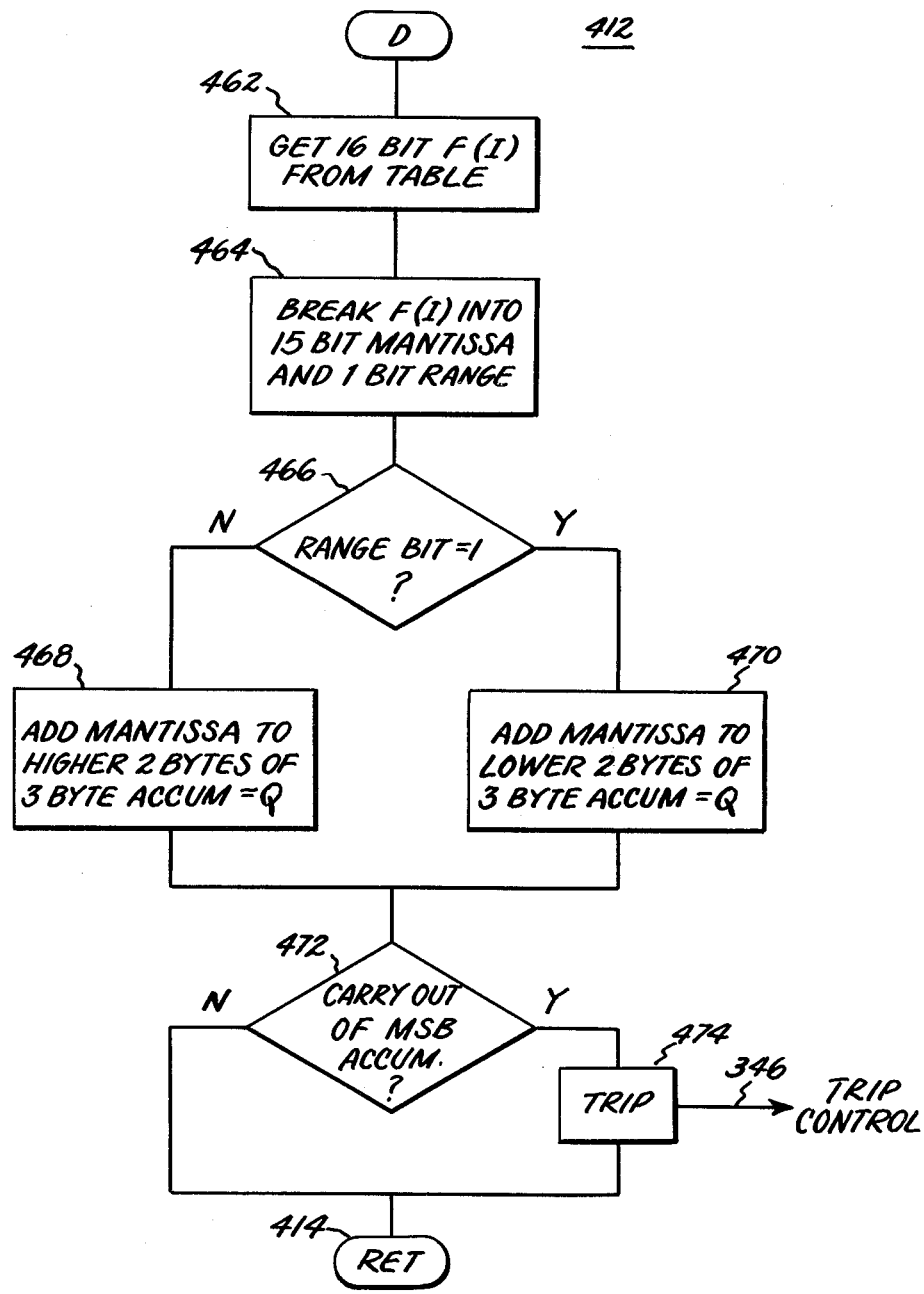

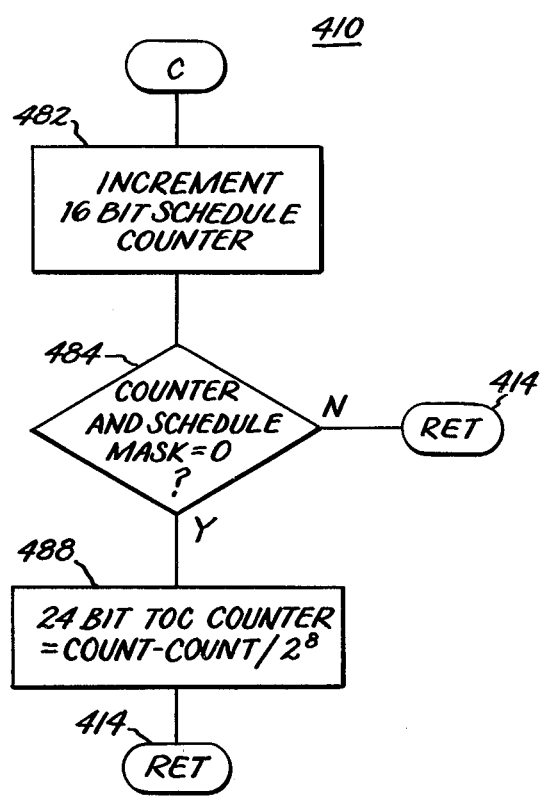

METHOD FOR OVERCURRENT PROTECTION

BACKGROUND OF THE INVENTION

This invention relates to power distribution overcurrent protection. More specifically it relates to a method for generating a circuit interruption signal based on a generalized time delay function during which time delay a current overload is allowed to continue. Further, it relates to inherent thermal protection which may be added to and included with the generalized function to increase the versatility and response time of the afforded protection.

Circuit protection means, such as circuit breakers, contactors, or fuses, in industrial power distribution systems or networks are used to provide protection against faults such as overloads and short circuits. Faults generally cause current to flow through more than one circuit breaker. A heirarchy is generally predeterminedly established to trip the desired circuit breaker, i.e. preferably the one electrically closest to the fault which will serve to isolate the fault while permitting the rest of the network to continue normal operation. This heirarchy is typically achieved by coordination of breaker response to time versus current detection characteristics at each circuit breaker. These characteristics are typically selected so that the desired breaker trips to remove the fault before sufficient time elapses for any other breaker to react. Thus, the branches of the network not experiencing a fault condition are permitted to continue normal operation.

In a typical industrial power distribution system, the electrical current must pass through several levels of protective breakers before it reaches the ultimate load. When it is desired to coordinate the control of the individual breakers during short circuits and overloads, a decision is generally made at each breaker based on a time versus current curve. For values of current greater than a preset pickup level, the curve indicates how long the breaker will delay before it trips or opens the circuit. Tripping strategies must be selected at each breaker to insure that only the breaker electrically near the fault or overload is tripped and, at the same time, to insure that the loads and power system conductors are protected from damage.

Two methods which are currently used to implement time versus current detection characteristics to provide circuit protection employ either thermal-magnetic devices or special purpose electronic timers.

A thermal-magnetic device is generally able to account for time varying loads to provide inherent thermal protection. Thermal protection is generally achieved by passing the breaker current through resistance heaters. For example, an overload subsequent to a continuous current at the rated value is detected more rapidly than an overload that occurs during initial energization or one that occurs after a continuous current current at less than the rated value. A disadvantage of thermal-magnetic protection is the relative inflexibility of the shape of its time versus current detection curve. The shape of the curve follows naturally from the thermal-magnetic principle and this places limitations on the number of breakers which can be coordinated since the shape cannot be readily changed.

Special purpose electronic timers are used to produce time versus current tripping characteristics that are generally more flexible than those of thermal-magnetic devices. However, they do not provide the inherent thermal protection of a thermal-magnetic device. That is, the time required to detect an overload does not depend on the current conditions prior to the overload. An overload on an initially fully loaded circuit, i.e. current at the rated value, is detected after the same time delay that occurs for detection of an overload on an initially unloaded circuit, i.e. no current or initial energization.

SUMMARY OF THE INVENTION

One object of the present invention is to provide a relay or contactor having a generalized time versus current tripping characteristic which can be set to any desired shape for currents greater than the pickup or actuation level.

Another object is to provide inherent thermal protection for a relay or contactor having a generalized time versus current tripping characteristic whereby the time required to detect an overload is reduced as current prior to an overload approaches the contactor pickup point.

In accordance with the present invention, a method for protecting a power distribution system from excessive current comprises storing a predetermined system parameter indicative of the predetermined time an actual system parameter is permitted to safely exist in the system, determining the value of the actual system parameter, repetitively modifying the value of the predetermined system parameter in accordance with the actual system parameter, thereby creating a dynamic history of the predetermined system parameter and interrupting power to the system if the predetermined system dynamic history exceeds a predetermined threshold. Further, the stored predetermined system parameter may be extended in an undefined region to decrease the reponse time to a fault on a previously overloaded branch.

The features of the invention believed to be novel are set forth with particularity in the appended claims. The invention itself, however, both as to organization and method of operation, together with further objects and advantages thereof, may best be understood by reference to the detailed description taken in connection with the accompanying drawing.

DESCRIPTION OF THE DRAWING

FIGS. 3A and 3B are schematic block diagrams of protection systems without and with inherent thermal protection, respectively, made in accordance with the present invention and employed in the microprocessor shown in FIG. 2.

FIGS. 4A and 4B are typical time vs. current curves showing the time the current can safely exist above the pickup value and the forcing function resulting therefrom for power distribution systems without inherent thermal protection.

FIGS. 6A–6E are logic flow charts of a microprocessor incorporated into a protective system made in accordance with the present invention.

DETAILED DESCRIPTION

Figure 1:
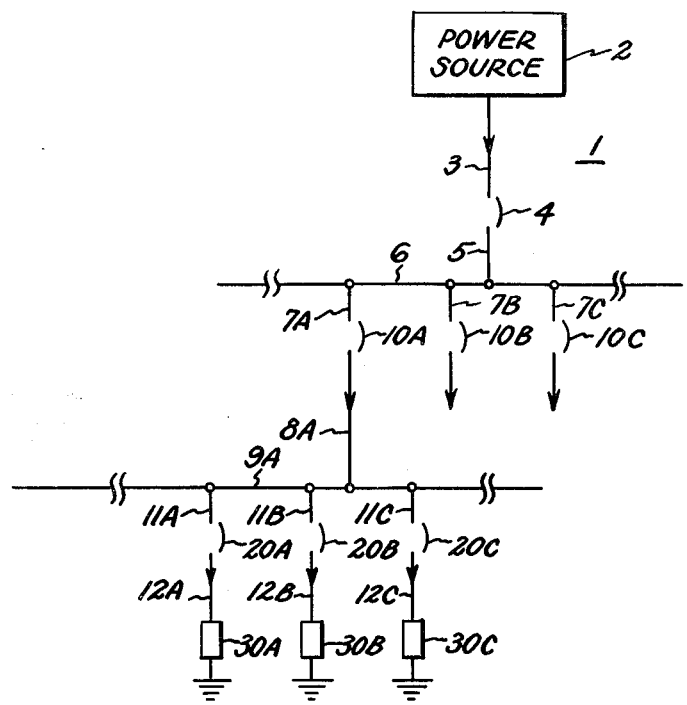
FIG. 1 is a schematic diagram of a conventional power distribution system.

Shown in FIG. 1 is a conventional industrial power distribution system. Electrical power from a power source 2 is coupled to a primary trunk line 6 by a main branch comprising circuit means 3 and 5 and normally closed main protective device means or circuit interruption means 4, such as a circuit breaker. Power is further distributed from trunk line 6, as for example by a feeder branch comprising circuit means 7A and 8A, and normally closed feeder protective device means or circuit interruption means 10A, such as a circuit breaker, to a secondary trunk line 9A. Additional power distribution from primary trunk line 6 may be effected, for instance, through analogous branches comprising circuit and protective device means 7B, 8B, 10B, and 7C, 8C, 10C, respectively, which distribution may be similarly expanded as required.

Power from secondary trunk line 9A is further distributed or subdivided, as for example by a branch comprising circuit means 11A and 12A and normally closed protection or electrical interruption means 20A, such as a circuit breaker or a fuse, to be coupled to a load 30A, as for instance machinery or lighting elements. Additional power distribution from secondary trunk line 9A may be effected to loads 30B and 30C, through analogous branches comprising circuit and protective device means 11B, 12B, 20B and 11C, 12C, 20C, respectively, which distribution may be similarly expanded as required.

As an example, a typical protection strategy for the distribution system shown in FIG. 1 establishes a heirarchy wherein feeder breaker 10A generally trips or opens the circuit for a fault on feeder branch 7A and 8A before main circuit breaker 4 trips. Likewise, circuit breaker 20A generally trips before feeder breaker 10A trips for a fault on branch 11A, 12A or load 30A. Also, all sections or branches of the power distrubtion network are protected by each protective means from a predetermined threshold value of operating current which exists for more than a predetermined period of time.

Figure 2:
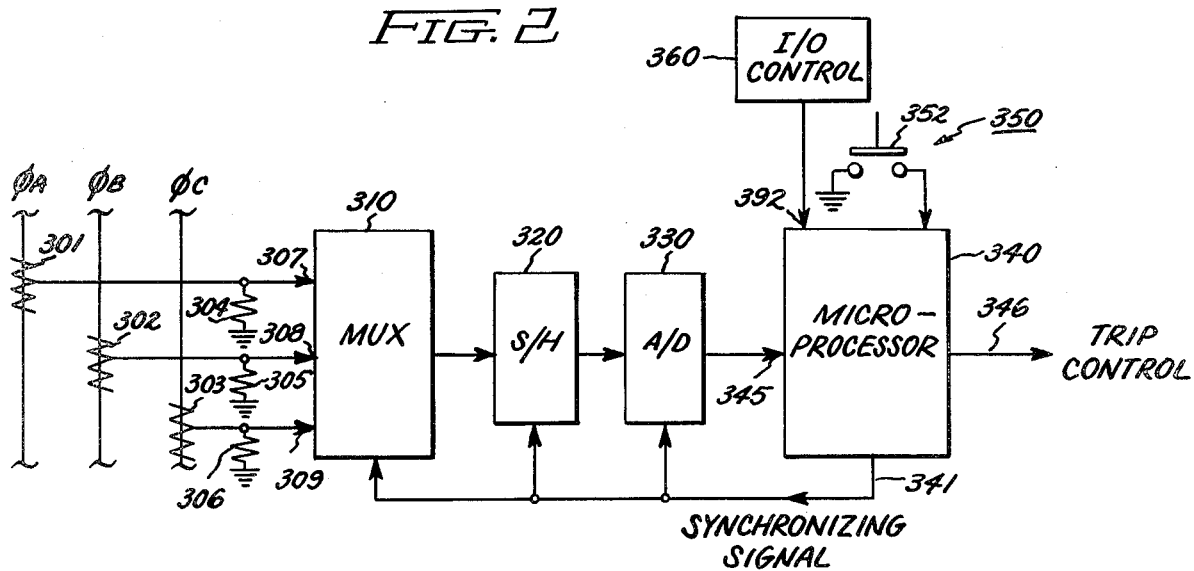
FIG. 2 is a schematic block diagram of a power distribution protection system made in accordance with the present invention.

Referring to FIG. 2, a partial schematic and block diagram of a control system for controlling the actuation of a circuit protection means in response to monitored circuit parameters is shown. Control system comprises multiplexer means 310 which may be a type AD7503D integrated circuit or the like manufactured by Analog Devices, Inc. Parameter coupling means 301, 302 and 303, each of which may comprise a current transformer, monitor a parameter in each phase of a three-phase power distribution system, respectively, typically current flow, and supply the value thereof to inputs 307, 308 and 309, respectively, of multiplexer means 310 in the form of a voltage developed across each of load resistors 304, 305 and 306, respectively. Multiplexer 310 provides the sampled parameters as an analog voltage to sample-and-hold (S/H) means 320 in response to a synchronizing control signal supplied thereto. The synchronizing control signal typically will cause the sensed parameter from each phase, which is respectively coupled to inputs 307, 308 and 309 of multiplexer 310, to be supplied to S/H circuit 320 during a predetermined time interval. S/H circuit 320 typically stores a sampled value of the signal available at its input and taken during a finite interval known as a sample window. S/H circuit 320 may be a type AD582RD integrated circuit or the like manufactured by Analog Devices, Inc., of Norwood, Mass. The output signal from S/H circuit 320, which is representative of the signal available at its input, is provided continuously to the input of an analog to digital (A/D) converter means 330, which may be a type AD571 integrated circuit or the like manufactured by Analog Devices, Inc., in order that the value of the analog signal to be converted into digital form remains invariant during the conversion time. The synchronization for triggering an output signal from multiplexer 310, determining the interval of the sample window for S/H circuit 320, and actuating analog-to-digital signal conversion in A/D converter means 330 is provided by synchronization signals available at an output 341 of a microprocessor means 340, which may be a type 8051 (8-bit) integrated circuit or the like manufactured by Intel, Inc., of Santa Clara, Calif. Reset means 350, such as a switch are coupled to microprocessor means 340 in order to reset and restart the program in microprocessor means 340 after a trip control signal has been generated. Input/output (I/O) control means 360, such as switches, are coupled to microprocessor means 340 for providing the values of predetermined parameters such as the desired time versus current characteristics of a protective device and thereby establishing initial parameters and constants in the microprocessor.

The output of A/D converter means 330 is coupled to an input port 345 of microprocessor means 340. The output signal of A/D converter means 330 is a binary digital representation of the sampled phase parameter, e.g. $\phi$ A current. A/D converter means 330 is selected to provide a digital output signal which is compatible with microprocessor means 340. If the digital output signal is not compatible, a buffer or logic level shifter (not shown) is required to interface between the output of A/D converter means 330 and input port 345 of microprocessor means 340.

In operation, multiplexer 310 responds to current conditions sensed in the power distribution system through current transformers 301, 302 and 303 in accordance with synchronization commands from microprocessor 340. As an example, typical synchronization commands are: transfer $\phi$A parameter to S/H circuit 320, start sample of $\phi$A parameter in S/H circuit 320, stop sample of $\phi$A parameter in S/H circuit 320, and convert sampled analog data to its digital equivalent in A/D converter means 330. In this fashion, the sampled $\phi$A parameter, in pulse-amplitude modulated form, is supplied to microprocessor 340 for manipulation therein. As will become apparent, infra, the microprocessor initiates an interruption in power supplied to the load if the amplitude history of that parameter exceeds a predetermined threshold for a predetermined time. Of course, in performance of sampling, the sample window may be made arbitrarily small.

Reset means 350 provides a signal at ground potential to input port 343 of microprocessor means 340 when switch 352 closes, enabling the trip control signal available at output port 346 of microprocessor means 340 to be reset to a non-tripped condition. Switch 352 is open during normal operation.

I/O control 360 provides initial settings, such as the desired tripping time as a function of possible input currents and circuit parameters, such as the cooling time constant of a circuit protective device, to input port 342 of microprocessor or means 340.

Referring to FIG. 3A, a schematic block diagram of the manipulation of data within microprocessor means 340 is shown for a system without inherent thermal protection.

A parameter such as the instantaneous value of the current in the distribution system to be protected shown in FIG. I, is sampled at protective device 10A for example, and is supplied to input port 345 of microprocessor means 340, shown in FIG. 2, from A/D converter means 330 as hereinbefore described. The parameter I is supplied to forcing or mapping function generator means 101 and threshold detector means 104. The forcing function signal F(I) available from forcing function generator means 101 is supplied to input 102a of accumulator means 102, while threshold detector 104 is coupled to input 102b of accumulator means 102. The output of accumulator means 102 is coupled to input 103a of comparator means 103, while a storage means 105, whereat trip threshold signal $Q_{ref}$ is available, is coupled to input 103b of comparator means 103. Input port 342 of microprocessor means 340, having available trip threshold signal $Q_{ref}$ from I/O control means 360 (shown in FIG. 2), is coupled to storage means 105.

The forcing function F(I) is generated in accordance with the following equation:

$$F(I) = \frac{\Delta t \cdot Q_{ref}}{T(I)}, \qquad (1)$$

wherein T(I) is the desired trip time as a function of current, $\Delta t$ is the sample time step and $Q_{ref}$ is the trip threshold which is predetermined and represents how hot the protective device can get without causing damage thereto. Forcing function F(I) is a thermal accumulation rate and is analogous to heat dissipated.

T(I) is derived from the time versus current curve as shown in FIG. 4A, which illustrates the desired tripping time of circuit protective device 10A, shown in FIG. 1, as a function of possible input currents. The desired time versus current is determined by the configuration of the electrical distribution system of FIG. 1, the type of protective device 10A used in the power distribution system of FIG. 1, and the response time desired. T(I) may be stored in the memory of microprocessor means 340, shown in FIG. 2, in the form of an approximation determined by a plurality of coordinate pairs or points along the time versus current curve T(I) available from I/O control means 360. Since time versus current curve T(I) is stored in microprocessor means 340, the curve may be readily changed to some other desired shape by changing the information input to microprocessor meand 340 from I/O control means 360 without changing the type of protective device used. The ability to readily change the shape of the time versus current curve T(I) with the present invention offers greater flexibility over existing protection methods wherein the shape of the time versus current curve T(I) is limited by physical constraints of the protection device used. The sample step $\Delta t$, which is typically 1/60 second, represents how often the accumulated result $Q_{new}$ is updated.

Trip threshold $Q_{ref}$ represents a threshold of how much current the controlled circuit protective device can pass without burning out, and is preselected to be the number required by dynamic time range, from which all other factors are scaled. That is, $Q_{ref}$ is selected to be the largest number which can be represented in microprocessor 340 and all other factors are scaled down therefrom in order to provide the greatest dynamic time range. Thus when the accumulated value Q signal supplied as shown in FIG. 3A, to input 103a of comparator means 103 equals or is greater than trip threshold $Q_{ref}$ at input 103b thereof, a trip signal will be provided at the comparator output.

Accumulator means 102, upon receipt of forcing function F(I) from function generator 101, adds the forcing function F(I) to the present accumulated value $Q_{old}$ stored therein, and stores the accumulated result $Q_{new}$ in place of the former accumulated value $Q_{old}$. In this way, accumulator means 102 creates a dynamic history of forcing function F(I). Accumulated result $Q_{new}$ is provided to comparator means 103 at input 103a thereof as the accumulated function Q; i.e., $Q_{new}=Q$. Accumulated function Q is analogous to temperature. Comparator means 103 compares the value of accumulated function Q with trip threshold signal $Q_{ref}$ and provides a trip control signal to a circuit protective device if $Q \geq Q_{ref}$.

Threshold detector means 104 responds to the value of the root mean square of current I available at the input of function generator 101. If the rms value of parameter I is less than a predetermined threshold value, a reset signal is provided from threshold detector means 104 to input 102b of accumulator means 102 in order to set accumulated function $Q_{new}$ equal to zero and thereby allow the microprocessor to recover from a temporary overload. Generally the threshold value of threshold detector means 104 is set at the value of the maximum continuous current which can flow indefinitely through the controlled protective device without causing damage to the power distribution system.

Referring to FIG. 3B, a schematic block diagram of the manipulation of data within microprocessor means 340 is shown for a system with inherent thermal protection.

A parameter, such as the instantaneous value I of the current in the distribution system to be protected, shown in FIG. 1, is sampled at protective device 10A for example, and is supplied to input 345 of microprocessor means 340 shown in FIG. 2 from D/A converter means 330 as hereinbefore described. The parameter I is supplied to forcing or mapping function generator means 201. The forcing function signal F(I) available from forcing function generator means 201 is supplied to input 202a of accumulator means 202. The output of accumulator means 202 is supplied to input 203a of comparator means 203 and to reset means 204. The output of reset means 204 is coupled to input 202b of accumuator means 202. A storage means 205, whereat trip threshold signal $Q_{ref}$ is available, is coupled to input 203b of comparator means 203. Input port 342 microprocessor means 340, having available trip threshold signal $Q_{ref}$ from I/O control means 360 (shown in FIG. 2), is coupled to storage means 205.

The forcing function F(I) is generated in accordance with the following equation:

$$F(I) = \frac{\frac{\Delta t}{\tau} \cdot Q_{ref}}{1 - \left(1 - \frac{\Delta t}{\tau}\right) \frac{T(I)}{\Delta t}}, \qquad (2)$$

wherein $\Delta t$ is the sample time step, $Q_{ref}$ is the trip threshold which is predetermined and represents how hot the protective device can get without causing damage thereto, T(I) is the desired trip means as a function of current and $\tau$ is the cooling or thermal time constant of the load protected, which is the time necessary for the load to reach a new thermal equilibrium after it has received a step overload of current. Thus $\tau$ is a physical constant of the load and therefore may be determined by measurement, calculation or estimation. Typical values of $\tau$ are 25 minutes for a motor and 5 minutes for an electronic (SCR) drive. Forcing function F(I) is a thermal accumulation rate and is analogous to heat dissipated.

Figure 5A:
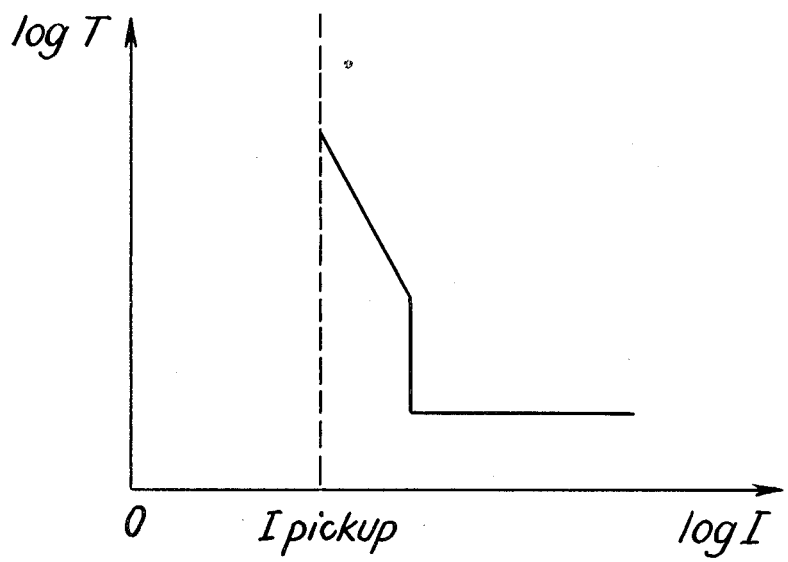
FIGS. 5A and 5B are typical time vs. current curves showing the time the current can safely exist above the pickup value and the forcing function resulting therefrom for power distribution protection systems with inherent thermal protection.

T(I) is derived from the time versus current curve as shown in FIG. 5A, which illustrates the desired tripping time of circuit protective device 10A, shown in FIG. 1, as a function of possible input currents. The desired time versus current curve is determined by the configuration of the electrical distribution system of FIG. 1, the type of protective device 10A used in the power distribution system of FIG. 1, the response time desired and is selected to coordinate with upstream and downstream devices. T(I) may be stored in the memory of microprocessor means 340, shown in FIG. 2, in the form of an approximation determined by a plurality of coordinate pairs or points along the time versus current curve T(I) available from I/O control means 360. Since time versus current curve T(I) is stored in microprocessor means 340, the curve may be readily changed to any desired shape as hereinbefore explained.

The sample time step $\Delta t$, which is typically 1/60 second, represents how often the accumulated result $Q_{new}$ is updated. Trip threshold $Q_{ref}$ is selected as hereinbefore described.

Referring to FIG. 5A, at the trip or pickup point, T(I) becomes infinite and, from equation (2), the forcing function F(I) becomes equal to:

$$F(I) = \frac{\Delta t}{\tau} \cdot Q_{ref}.$$

Figure 5B:
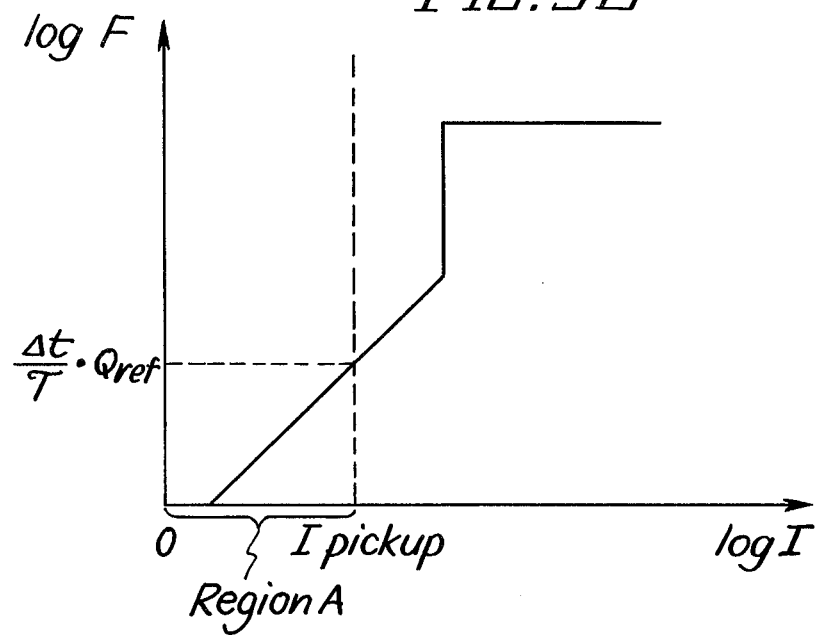

Inherent thermal protection is provided by extending the F function quadratically in region A as shown in FIG. 5B, for values of current (I) which are less than the trip or pickup point because from equation (2) it is noted that F(I) is undefined for the range of current in region A.

Thus the features of inherent thermal protection have been provided with generalized tripping time versus current characteristic. The generalized tripping curve is realized by the forcing function F(I) for values of current greater than pickup value. A step overload from zero current will be detected in the desired time. A step overload from an initial value of current greater than zero is detected sooner than the same overload occurring after a period of no current because of the extension of the forcing function F(I) curve for values of current between zero and the pickup point. As the value of current prior to the overload approaches the pickup point, the time to respond to an overload is reduced. This reduction in response time provides inherent thermal protection by accounting for the thermal stresses ($I^2R$ losses) on a circuit protection device before an overload occurs. By predetermined shaping of the time versus current curve of protective means of the types such as 4, 10A and 20A of FIG. 1, coordination between the protective means to achieve proper tripping sequences can be effected.

In the circuit of FIG. 3B, accumulator means 202 upon receipt of forcing function F(I) from function generator 201, adds forcing function F(I) to the present accumulated value $Q_{old}$ stored therein, subtracts reset function $$\frac{\Delta t}{\tau} \cdot Q_{old},$$

and stores the accumulated result $Q_{new}$ in place of the former accumulated value $Q_{old}$. In this way, accumulator means 202 creates a history of forcing function F(I). The input of reset means 204 is coupled to the output of accumulator means 202 wherefrom it receives the present accumulated value $Q_{old}$. Reset means 204 operates on present accumulated value $Q_{old}$ to generate reset function $$\frac{\Delta t}{\tau} \cdot Q_{old}$$

supplied to input 202b of accumulator means 202 from the output of reset means 204. Thus forcing function F(I) tends to increase present accumulated result $Q_{new}$ while the previous accumulated result $Q_{old}$ tends to decrease $Q_{new}$.

Figure 6C:
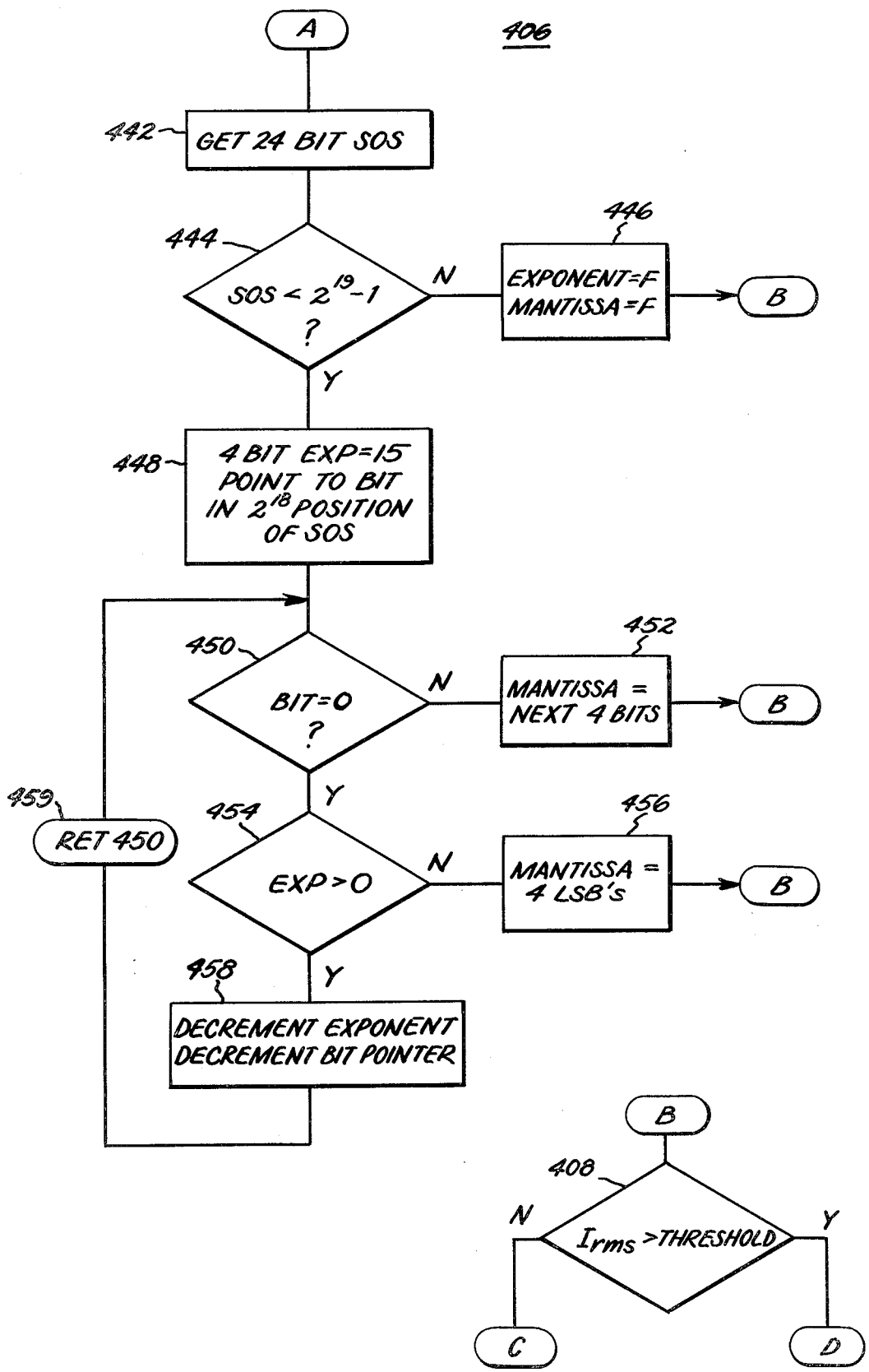

Referring to FIGS. 6A–6E, logic flow diagrams of microprocessor means 340 incorporated into the protective system illustrated in FIG. 2 are shown. The logic is generally the same for systems without and with inherent thermal protection except for reset step 410 and values of the forcing function F(I) stored in the microprocessor 340. FIG. 6A shows the general data flow and operations within microprocessor 340. Microprocessor means 340, when constituting a type 8051 integrated circuit or the like, employs bytes which are 8 bits long and the program logic of the present invention, though specified for this type of device, can be modified to accommodate other microprocessors employing bytes of greater or fewer bits. A more detailed flow chart for each operation is provided as indicated by the figure designated within each operation block. The main logic program begins at a start step 402 and rapidly proceeds to a sum of squares (SOS) step 404, at which time programming steps are performed to sample a system parameter I and to sum the squares of the sampled values, thus providing the means square value of the current from which the root mean square (rms) value is determined. After completing the operations in SOS step 404, indicated as point A, the main program begins to perform the step 406 of pseudo-floating point conversion which operates to increase the dynamic range of the system without using more than 8 bits, thus providing the advantages of floating point manipulation. After completion of the operation in logic step 406, indicated as point B, the main program encounters a conditional branch step 408.

For a system without inherent thermal protection, such as shown in FIG. 3A, a test is made at conditional branch step 408 which determines whether the parameter $I_{rms}$ is greater than the threshold stored in threshold detector means 104. If the parameter $I_{rms}$ is not greater than the stored threshold, the program follows the logic path designated N, indicated as point C, to issue a reset signal to accumulator means 102 at step 410, and the program proceeds to a return step 414 which causes the program to return to start step 402 and repeat the process.

If the test at conditional branch step 408 indicates that parameter $I_{rms}$ is greater than the threshold stored in threshold detector means 104, the program follows the logic path designated Y, indicated as point D. The look up table add step 412 operations are performed and after completion, the program proceeds to return step 414 which causes the program to return to start step 402 and repeat the process. In all cases for the system of FIG. 6A with inherent thermal protection, the program proceeds directly from step 406 to execute step 412 and then executes step 410 before executing return step 414 which causes the program to return to start step 402 and repeat the process. Thus in the system of FIG. 6A with inherent thermal protection, conditional branch step 408 is bypassed.

Referring to FIG. 6B for details of the sum of squares step shown in FIG. 6A, microprocessor 340 is begun at start step 402, which is typically executed 60 times per second on an interrupt basis. At step 422, the program initializes 3 bytes or 24 bits of an accumulator 102 or 202 shown in FIGS. 3A or 3B, to be used to store the sum of the squares of parameter $I_{rms}$ or the value Q, to equal zero, and also initializes a sample counter (not shown) to equal zero. The count in the sample counter represents the number of times the sample iterative loop has been executed. For example, twelve executions per main program cycle of the sample loop are used, although a greater or lesser number are possible and the optimum number may be determined by simple experimentation or calculation for a particular protection system configuration. From step 422, the program enters the sample iterative loop at step 424. At step 424, the microprocessor 340 obtains parameter I from each phase of the power distribution system which is being monitored. The proper timing and synchronization signals for multiplexer means 310, S/H means 320 and A/D converter means 330 of the power distribution protection system of FIG. 2 are made available at output 341 of microprocessor means 340. The digital output representation of the analog signal input to A/D converter means 330 contains 9 bits of data when an AD571 A/D integrated circuit is used. Of course other A/D converters may be used and if the digital bit length is not nine, a simple program modification can be made to accommodate the data.

After step 424 is completed, step 426 to square each of the values of parameter I obtained in step 424 is performed. The two least significant bits (LSB's) from each calculation are disregarded. The results for each phase of step 426 are stored during step 428 in a respective accumulator (not shown). The initial contents of each accumulator is zero. In step 428, the result of step 426 is aded to the present value for a power phase and the new result is stored in the accumulator. Thus, for a 3-phase system, there will be three sum of the squares (SOS) accumulators. Three bytes or 24 bits are needed for each accumulator since a 16 bit number added 12 times yields a 19 bit number which is too large to store in two bytes.

After step 428, step 429 is performed to increment the sample count by 1. The sample count represents the number of times the sample loop has been executed. Conditional branch step 430 involves monitoring the sample count. If the sample count is less than 12, the program follows the N path to step 432 and then to step 424, where the program will begin to again execute the sample iterative loop. If the sample count is equal to 12, indicating that the sample iterative loop has been executed twelve times, the program will follow the Y path from step 430 to step 434. At step 434 the phase having the largest number stored as the sum of the squares (SOS) of the parameter $(I_{rms})^2$ from the twelve samples is selected for use in the succeeding program steps for time-overcurrent (TOC) determination. Alternatively, the sum of the squares of the parameter $(I_{rms})^2$ from each phase could be summed together and the total divided by the number of phases to obtain an average system current for use in succeeding program steps. Steps 422 to 434 are the part of the program which converts instantaneous current I samples to SOS or $(I_{rms})^2$.

Reference block A indicates the program is continued in FIG. 6C at step 442. Step 442 is performed by storing the selected largest SOS value, a twenty-four bit number, for use in performing conditional branch step 444. Conditional branch step 444 constitutes a test to determine whether the largest selected SOS is less than $2^{19}-1$ which is the maximum useable range of the microprocessor 340. If the largest selected SOS is not less than $2^{19}-1$, the N path from step 444 is followed to step 446 indicating it is out of range. At 446, the exponent and the mantissa are set, as described below, at their maximum value, i.e. hexadecimal value F or binary value 1111, indicating the current is too high to be represented by the useable range of the microprocessor 340. If the largest SOS is less than $2^{19}-1$, then the program follows the Y path from step 444 to step 448.

At step 448, a four bit exponent in an exponent counter is set to equal 15 which is the equivalent of all 1's in binary, and a pointer is set to point at the bit in the $2^{18}$ position of the selected SOS. An iterative search loop is established comprising steps 450, 454, 458, and 459, for determining the first non-zero bit of the selected SOS starting with the $2^{18}$ bit, and for assigning the next four bits after the first detected non-zero bit as a mantissa. At the determination of the first non-zero bit, the number remaining in the exponent counter is assigned as an exponent. Thus, the iterative search loop converts 3 bytes or 24 bits of data into one byte or 8 bits, i.e. 4 bit exponent and 4 bit mantissa, by using a pseudo-floating point or pseudo-logarithmic conversion technique.

After assigning a 4 bit exponent equal to 15 and pointing at the bit in the $2^{18}$ position of the selected SOS, at step 448, the iterative search loop is entered at conditional branch step 450. At step 450 the bit to which the pointer is pointing is examined to determine if the bit is equal to zero. If the bit is not equal to zero, meaning that it is equal to one since there are only two logic states in binary arithmetic, the program follows the N path to arrive at step 452. Step 452 assigns the next four bits after the bit to which the pointer is pointing to be the mantissa. For example, in the first pass through the iterative search loop, if the bit in the $2^{18}$ position is a one, then the mantissa is the four bits in the $2^{17}-2^{14}$ places of the selected SOS value. The exponent for this example is the number in the exponent counter or 15.

If the bit to which the pointer is pointing at step 450 is a zero, the program follows the Y path to arrive at conditional branch step 454. Conditional branch step 454 constitutes a test to determine whether the number remaining in the exponent counter is greater than zero. If the number remaining in the exponent counter is not greater than zero, indicating that the exponent is zero and that the sixteenth iteration of the search loop has been performed without the pointer having pointed to a bit which is not equal to zero, then the program follows the N path to step 456. At step 456 the four least significant bits (LSB's) of the selected SOS are assigned to be the mantissa, and the exponent is assigned to be zero.

If the exponent at step 454 is greater than zero, meaning that fewer than sixteen passes have occurred through the iterative search loop but that the pointer is still not pointing to a non-zero or 1 bit, then the program follows the Y path to step 458. At step 458, the exponent in the exponent counter is decremented by one and the bit pointer is decremented by one place so that it points to the bit in the next most significant bit position of the selected SOS value. After completing step 458, the program executes step 459 which returns the program to step 450, the beginning of the iterative search loop. Thus, the iterative search loop compresses a 3 byte or 24 bit data word into a one byte or 8 bit data word having the four MSB's as an exponent and the four LSB's as a mantissa. This compression increases the dynamic range of the microprocessor without using more than 8 bits, giving all the advantages of floating point arithmetic.

Whether the program branches to step 446 (out of range) or from the iterative search loop to step 452 or 456, the program continues at conditional branch step 408. For a system, such as shown in FIG. 3A, without inherent thermal protection, the test at step 408 is whether the sampled parameter $I_{rms}$ is greater than a predetermined threshold. If the sampled parameter $I_{rms}$ is not greater than a predetermined amplitude threshold, the program follows the N path to step 482 of FIG. 5E. If the sampled parameter $I_{rms}$ is greater than the predetermined amplitude threshold and for all cases in a system having inherent thermal protection, such as shown in FIG. 3B, the program follows the Y path to step 462 of FIG. 6D.

Step 462, of FIG. 6D obtains a forcing function F(I) from a table which has been previously stored in forcing function generator 101 or 201 microprocessor means 340 shown in FIG. 3A or 3B. The exponent and mantissa as determined by step 446, 452 or 456 in the flow chart of FIG. 6C are used as the address for accessing the proper forcing function F(I) stored in the table. The forcing function F(I) is stored by using an approximation comprising a pair of coordinates or points of the log F versus log I as hereinbefore described. The forcing function obtained from the table stored in the microprocessor is 16 bits long.

After obtaining the forcing function F(I), step 464 is performed, partitioning the 16 bit forcing function F(I) into a one bit range comprising the MSB and a mantissa comprising the other 15 bits. A conditional branch test performed at step 466 then tests whether the partitioned range bit is equal to 1. If the partitioned range bit is not equal to 1, the program follows the N path to step 468. At step 468, the 15 bit mantissa right justified, i.e. LSB of mantissa in 2° position, is added to the higher two bytes of a three byte accumulator 102, 202 shown in FIG. 3A or 3B storing the value $Q_{new}$. If the partitioned range bit is equal to 1, the program follows the Y path from step 466 to step 470. At step 470, the 15 bit mantissa right justified is added to the lower two bytes of the three byte accumulator assigned to store the value $Q_{new}$. Thus two time ranges are created in order to expand the dynamic time range of microprocessor means 340.

From either step 468 or 470 the program next executes conditional branch step 472 by testing whether a carry operation of the MSB in the additions of step 468 or 470 was necessary. If a carry was not necessary at step 468 or 470, the program follows the N path to step 414 which returns the program to step 402 (in FIG. 6A) in order to begin another cycle. If a carry was necessary at step 468 or 470, the program follows the Y path to step 474. At step 474, a trip control signal is generated and supplied at output port 346 of microprocessor means 340, shown in FIG. 2. After executing step 474, the program executes step 414, which step returns the program to start step 402 of FIG. 6A in order to begin another cycle. However, once a trip control signal has been generated, it is necessary to reset the microprocessor means 340 of FIG. 2 by applying a signal (typically at ground potential), by reset means 350, to microprocessor input port 343.

If the test at step 408 in FIG. 6C indicates that the parameter $I_{rms}$ is not greater than the predetermined amplitude threshold, which is calculated from the allowable continuous current, then the program follows the N path to step 482 of FIG. 6E. At step 482, the 16 bit schedule counter (not shown) is incremented by one and then conditional branch step 484 is performed. The schedule counter is used to increase the dynamic range of the cooling of a controlled protective device to accommodate a large range for the value of $\tau$ and together with the schedule mask (not shown) determines how frequently the cooling function is calculated. The schedule counter keeps a record of the number of times the program has reached step 482. The schedule mask is determined by the value of the thermal time constant $\tau$ selected and represents how often the cooling calculation at step 488 is run relative to the program having reached step 482. Generally, the larger $\tau$, indicating a larger thermal time constant and therefore less cooling per program cycle, the less frequently the cooling calculation is run. Step 484 determines whether the 16 bit schedule counter logically ANDed with the schedule mask is not true, that is, whether the schedule and schedule mask are equal. If the result in step 484 is not true, i.e. schedule counter and schedule mask are not equal, then the program follows the N path to step 414 which returns the program to start step 402 of FIG. 6A, whereat the program is ready to begin another cycle. Thus, the cooling step 488 is bypassed indicating that cooling is not scheduled on this pass through the program.

If the result in step 484 is true, i.e. schedule counter and schedule mask are equal, then the program follows the Y path to step 488. In step 488, the number in the 24 bit time over current TOC counter 202 of FIG. 3B, which represents Q, has subtracted from it a number equal to the number in the 24 bit TOC counter divided by $2^8$ and stores the result in the 24 bit TOC counter. The factor $$x - \frac{x}{2^8} = \frac{255}{256} \cdot x,$$

where x is the present number in the 24 bit TOC counter, represents the largest fraction less than one of a number x which can be taken using an 8 bit byte for the operation of step 488. Thus step 488 effectively subtracts $$\frac{1}{256} \cdot x$$

from x and stores the result in the 24 bit TOC counter each time step 488 is performed in order to approximate the cooling curve of a controlled protective device. After step 488, the program is returned in step 414 to start step 402 of FIG. 6A, at which time the program is ready to being another cycle.

The foregoing describes a method for providing overcurrent protection in a power distribution protection system, both without and with inherent thermal protection for a relay or contactor having a generalized time versus current tripping characteristic which can be set to any desired shape for currents greater than the pickup or actuation level. Although the description has been directed to protecting a single 3-phase line, a plurality of 3-phase lines may be protected by producing the required microprocessor inputs in an analogous manner as hereinbefore described and by scheduling the microprocessor to produce the required timing and synchronization signals.

Further, the microprocessor system of FIGS. 3A and 3B may alternatively be implemented using analog circuits or digital hardware to obtain the desired functions indicated and described hereinabove.

While only certain preferred features of the invention have been shown by way of illustration, many modifications and changes will occur to those skilled in the art. It is to be understood that the appended claims are intended to cover all such modifications and changes as fall within the true spirit and scope of the invention.

What is claimed is:

1. A method for protecting a power distribution system from excessive current, the system including circuit interruption means for interrupting power to the system, comprising:
    (a) storing a predetermined system parameter, wherein the predetermined system parameter includes a forcing function F(I) defined by:

$$F(I) = \frac{\frac{\Delta t}{\tau} \cdot Q_{ref}}{1 - \left(1 - \frac{\Delta t}{\tau}\right)^{\left(\frac{T(I)}{\Delta t}\right)}}$$

wherein T(I) is the desired time to remove power from the system, $\Delta t$ is the time during which an actual system parameter is determined, $Q_{ref}$ is a first predetermined threshold and is the thermal time constant of said circuit interruption means, and wherein the predetermined system parameter is indicative of the predetermined time the actual system parameter is permitted to safely exist in the system;

(b) quadratically extending said forcing function F(I) into the region between F(I)=0 and $$F(I) = \frac{\Delta t}{\tau} \cdot Q_{ref},$$

whereby the response time to interrupt power to the system when threshold $Q_{ref}$ is exceeded is decreased;
    (c) determining the value of the actual system parameter;
    (d) repetitively modifying the value of said predetermined system parameter in accordance with said actual system parameter, thereby creating a dynamic history of said predetermined system parameter; and
    (e) generating a control signal to actuate said circuit interruption means if the predetermined system parameter dynamic history exceeds a second predetermined threshold.

2. A method as in claim 1, wherein storing and comparing of the predetermined and actual system parameter, respectively, are performed by a microprocessor.

3. The method of claim 1, further comprising repeating steps b, c, d and e thereof at predetermined intervals.

4. The method of claim 1, wherein the actual system parameter comprises current in the system.

5. The method of claim 1, wherein the predetermined system parameter includes a forcing function (F(I) defined by $$F(I) = \frac{\Delta t \cdot Q_{ref}}{T(I)}.$$

6. The method of claim 5, wherein the dynamic history of the predetermined system parameter is created by adding the forcing function F(I) to an accumulated value $Q_{old}$.

7. The method of claim 1, wherein the history of the predetermined system parameter is created by adding the forcing function F(I) to an accumulated value $Q_{old}$ and subtracting a portion of the accumulated value $$\frac{\Delta t}{\tau} \cdot Q_{old}$$

therefrom.

8. The method of claim 1, further comprising the steps of comparing the actual system parameter with a third predetermined threshold and resetting the dynamic history of the predetermined system parameter to zero if the actual system parameter is less than said third predetermined threshold.

* * * * *